(12) United States Patent
Asayama

(10) Patent No.: US 8,887,776 B2
(45) Date of Patent: Nov. 18, 2014

(54) PNEUMATIC TIRE

(75) Inventor: Yoshinori Asayama, Osaka (JP)

(73) Assignee: Toyo Tire & Rubber Co., Ltd., Osaka-shi (JP)

(*) Notice: Subject to any disclaimer, the term of this patent is extended or adjusted under 35 U.S.C. 154(b) by 0 days.

(21) Appl. No.: 13/404,211

(22) Filed: Feb. 24, 2012

(65) Prior Publication Data

US 2012/0234448 A1 Sep. 20, 2012

(30) Foreign Application Priority Data

Mar. 17, 2011 (JP) .................. 2011-059522

(51) Int. Cl.
| | |
|---|---|
| B60C 19/00 | (2006.01) |
| B60C 19/08 | (2006.01) |
| B60C 15/00 | (2006.01) |
| B60C 15/06 | (2006.01) |

(52) U.S. Cl.
CPC ............ *B60C 19/088* (2013.04); *B60C 19/082* (2013.04); *B60C 19/086* (2013.04); *Y10S 152/02* (2013.01)
USPC .................. 152/152.1; 152/DIG. 2; 152/539; 152/543; 152/546

(58) Field of Classification Search
CPC ............... B60C 15/06; B60C 15/0607; B60C 2015/0614; B60C 2015/0617; B60C 19/08; B60C 19/088
USPC .......................... 152/152.1, DIG. 2, 539–547
IPC ............................................. B60C 19/08, 15/06
See application file for complete search history.

(56) References Cited

U.S. PATENT DOCUMENTS

| | | | | |
|---|---|---|---|---|
| 2,339,546 | A | * | 1/1944 | Hanson ...................... 152/152.1 |
| 2006/0102264 | A1 | * | 5/2006 | Nicolas ...................... 152/152.1 |
| 2007/0000585 | A1 | * | 1/2007 | Uchida et al. .............. 152/152.1 |
| 2007/0163690 | A1 | | 7/2007 | Nobuchika et al. |
| 2008/0295934 | A1 | | 12/2008 | Mafune et al. |
| 2010/0243115 | A1 | * | 9/2010 | Wada ......................... 152/152.1 |

FOREIGN PATENT DOCUMENTS

| | | |
|---|---|---|
| EP | 1738935 A2 | 1/2007 |
| EP | 1803589 A1 | 7/2007 |
| EP | 1844958 A1 | 10/2007 |
| JP | 2007-176437 A | 7/2007 |
| JP | 2008-296634 A | 12/2008 |
| JP | 2009-113597 A | 5/2009 |

OTHER PUBLICATIONS

Extended European Search Report mailed Jul. 13, 2012, issued in corresponding European Patent Application 12159503.7.
Chinese Office Action dated Jan. 6, 2014, issued in corresponding Chinese Patent Application No. 2012100713901, w/English translation (13 pages).
Japanese Office Action dated Jun. 24, 2014, issued in corresponding JP application No. 2011-059522 with English translation (4 pages).

* cited by examiner

*Primary Examiner* — Justin Fischer
*Assistant Examiner* — Kendra Shin
(74) *Attorney, Agent, or Firm* — Westerman, Hattori, Daniels & Adrian, LLP

(57) ABSTRACT

A pneumatic tire has a nonconductive tread rubber constructing an outer surface of a tread portion, a nonconductive side wall rubber constructing an outer surface of a side wall portion, and a rim strip rubber constructing an outer surface of a bead portion. The pneumatic tire has a conductive sheet formed by a conductive rubber. The conductive sheet reaches the rim strip rubber from the tread rubber while passing between a carcass and the side wall rubber, and terminates without being exposed to the outer surface of the bead portion. The rim strip rubber is partitioned into a nonconductive rubber portion and a conductive rubber portion, and the conductive rubber portion is connected to the conductive sheet and is exposed to a bead bottom surface.

5 Claims, 2 Drawing Sheets

(A)

(B)

(C)

US 8,887,776 B2

PNEUMATIC TIRE

BACKGROUND OF THE INVENTION

1. Field of the Invention

The present invention relates to a pneumatic tire which can discharge a static electricity generated in a vehicle body and a tire, to a road surface.

2. Description of the Related Art

In recent years, there has been proposed a pneumatic tire in which a rubber member such as a tread rubber or a side wall rubber is formed by a nonconductive rubber which is blended with a silica at a high ratio, in order to reduce rolling resistance of the tire which has a close relationship with fuel consumption efficiency. However, compared to a conventional rubber member blended with carbon black at a high ratio, such a rubber member has a higher electric resistance, and therefore static charge generated on a vehicle body or a tire is prevented from being released to a road surface. As a result, a problem such as radio noises tends to occur.

Accordingly, there has been developed a pneumatic tire which can achieve electrical conduction performance by setting a conductive portion which is made of a conductive rubber blended with carbon black or the like, while forming a tread rubber and a side wall rubber by a nonconductive rubber. For example, in a pneumatic tire described in the following Japanese Unexamined Patent Publication No. 2008-296634, a band-like rubber strip constructed by a conductive rubber is arranged so as to extend to an inner side in a tire diametrical direction from a tread rubber and reach a clinch rubber (a rim strip rubber), and a conductive route for discharging a static electricity is formed.

However, in the tire mentioned above, since the band-like rubber strip is exposed to an outer surface of a bead portion or a bead bottom surface, and it comes into direct contact with a rim, an exposure end portion of the rubber strip tends to wear out due to a rim friction, and there is a risk that an electrical conduction performance is adversely affected. In addition, in order to secure an effect of improving a rolling resistance, it is desirable to reduce a volume of a conductive rubber not only in a tread rubber and a side wall rubber, but also in a rim strip rubber.

SUMMARY OF THE INVENTION

The present invention is made by taking the actual condition mentioned above into consideration, and an object of the present invention is to provide a pneumatic tire which can prevent an adverse effect applied to an electrical conduction performance due to a rim friction, while reducing a volume of a conductive rubber in a rim strip rubber.

The object can be achieved by the following present invention. That is, the present invention provides a pneumatic tire comprising a carcass which reaches a bead portion from a tread portion via a side wall portion, a tread rubber which is formed by a nonconductive rubber and constructs an outer surface of the tread portion in an outer side of the carcass, a side wall rubber which is formed by a nonconductive rubber and constructs an outer surface of the side wall portion in the outer side of the carcass, and a rim strip rubber which constructs an outer surface of the bead portion in the outer side of the carcass, wherein the pneumatic tire has a conductive sheet which is formed by a conductive rubber, reaches the rim strip rubber from the tread rubber while passing between the carcass and the side wall rubber, and terminates without being exposed to an outer surface of the bead portion, and wherein the rim strip rubber is partitioned into a nonconductive rubber portion and a conductive rubber portion, and the conductive rubber portion is connected to the conductive sheet and is exposed to a bead bottom surface.

In the pneumatic tire in accordance with the present invention, it is possible to discharge a static electricity which is generated in a vehicle body and a time, through the conductive sheet which reaches the rim strip rubber from the tread rubber, and the conductive rubber portion of the rim strip rubber. Further, since the conductive sheet is terminated without being exposed to the outer surface of the bead portion, and does not directly come into contact with the rim, and the conductive rubber portion constructing the rim strip rubber is exposed to the bead bottom surface, it is possible to prevent an adverse effect applied to the electrical conduction performance due to the rim friction. In addition, since the rim strip rubber is partitioned into the nonconductive rubber portion and the conductive rubber portion, it is possible to reduce a volume of the conductive rubber in the rim strip rubber.

In the present invention, it is preferable that the nonconductive rubber portion of the rim strip rubber covers the conductive rubber portion from an outer side in a tire width direction. In accordance with the structure mentioned above, the outer surface of the bead portion is formed by the nonconductive rubber portion, and it is possible to effectively reduce the volume of the conductive rubber in the rim strip rubber.

In the present invention, it is preferable that the conductive sheet is terminated between the carcass and the rim strip rubber, and the conductive rubber portion of the rim strip rubber covers a terminal end portion of the conductive sheet from an outer side in a tire width direction. In accordance with the structure mentioned above, it is possible to accurately connect the conductive rubber portion of the rim strip rubber to the conductive sheet.

In the present invention, it is preferable that the conductive sheet is extended to an inner side in a tire diametrical direction along the carcass, and is exposed in a bead toe side of the bead bottom surface. In accordance with the structure mentioned above, since the conductive sheet is exposed in the bead toe side of the bead bottom surface in which a risk of the attrition due to the rim friction is small, it is also possible to prevent the adverse effect applied to the electrical conduction performance due to the rim friction. In addition, since the terminal end portion of the conductive sheet is not arranged between the carcass and the rim strip rubber, it is possible to suppress a generation of a step defect such as an air remaining or the like.

In the present invention, it is preferable that the conductive rubber portion of the rim strip rubber is extended to the bead toe side along the conductive sheet. In this case, it is possible to well secure the electrical conduction performance.

DETAILED DESCRIPTION OF THE PREFERRED EMBODIMENTS

Figure 1:
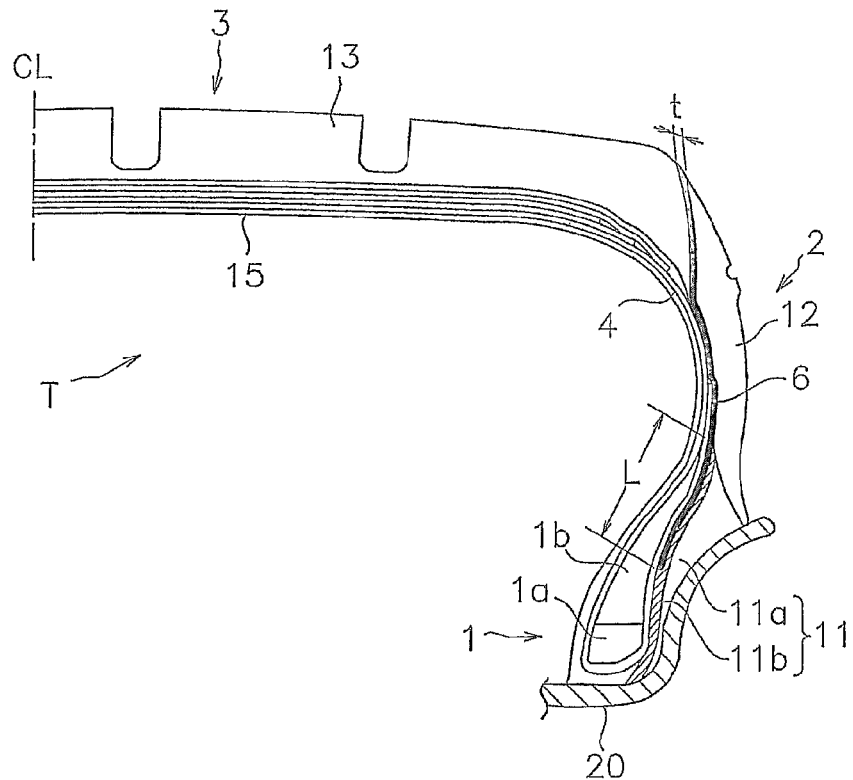
FIG. 1 is a half cross sectional view of a tire meridian showing an example of a pneumatic tire in accordance with the present invention.

An embodiment of the present invention will be explained with reference to the drawings. A pneumatic tire T shown in FIG. 1 is provided with a pair of bead portions 1, side wall portions 2 which extend to an outer side in a tire diametrical direction from the bead portions 1, and a tread portion 3 which is connected to outer ends in the tire diametrical direction of the side wall portions 2 and constructs a tread surface. In the bead portion 1, there are arranged an annular bead core 1a which is constructed by a convergence body obtained by laminating and winding a rubber coated bead wire, and a bead filler 1b which is positioned in an outer side in the tire diametrical direction of the bead core 1a.

The pneumatic tire T is further provided with a carcass 4 which reaches the bead portion 1 from the tread portion 3 via the side wall portion 2, a tread rubber 13 which is formed by a nonconductive rubber and constructs an outer surface of the tread portion 3 in an outer side of the carcass 4, a side wall rubber 12 which is formed by the nonconductive rubber and constructs an outer surface of the side wall portion 2 in the outer side of the carcass 4, and a rim strip rubber 11 which constructs an outer surface of the bead portion 1 in the outer side of the carcass 4. An inner liner rubber 15 for maintaining air pressure is provided on the inside of the carcass layer 7.

The carcass 4 extends between the bead cores 1a which are arranged in a pair of bead portions 1, and is wound up to an outer side in the tire diametrical direction in such a manner as to pinch the bead core 1a and the bead filler 1b therebetween. The carcass 4 is constructed by at least one carcass ply which is obtained by coating ply cords arranged in an approximately orthogonal direction to a tire equator CL by a topping rubber. As the ply cord, a steel cord, and an organic fiber cord such as a polyester, a rayon, a nylon, an aramid or the like are preferably used.

Further, the tire T has a conductive sheet 6 which is formed by a conductive rubber, reaches the rim strip rubber 11 from the tread rubber 13 while passing between the carcass 4 and the side wall rubber 12, and terminates without being exposed to an outer surface of the bead portion 1. In the present embodiment, an upper end portion of the conductive sheet 6 is exposed to an outermost surface while passing between the tread rubber 13 and the side wall rubber 12, and a lower end portion terminates between the carcass 4 and the rim strip rubber 11. A thickness t of the conductive sheet 6 is, for example, between 0.2 and 1.5 mm. A width in a tire circumferential direction of the conductive sheet 6 is preferably equal to or more than 5 mm, and it may be arranged annularly along the tire circumferential direction.

As shown in FIG. 1, the rim strip rubber 11 is formed by two rubber layers, and is partitioned into a nonconductive rubber portion 11a which is formed by a nonconductive rubber, and a conductive rubber portion 11b which is formed by a conductive rubber, in a tire meridian cross section. The conductive rubber portion 11b is connected to the conductive sheet 6 and is exposed to a bead bottom surface, and it is possible to discharge a static electricity generated in the vehicle body and the tire, through a conductive route via the conductive rubber portion 11b of the rim strip rubber 11 and the conductive sheet 6 from the rim 20.

The conductive sheet 6 does not directly come into contact with the rim 20, the conductive rubber portion 11b is exposed to the bead bottom surface, and an outer surface of the bead portion 1 coming into contact with the rim 20 is formed by the rim strip rubber 11. The rim strip rubber 11 is formed by a high-modulus rubber which is more excellent in a wear resistance than that of the conductive sheet 6, and can prevent an adverse effect applied to an electrical conduction performance due to a rim friction. A modulus of a rubber (a 100% tensile modulus which is measured at 25° C. in conformity to JISK6251) is set 1 MPa or more higher in the rim strip rubber 11 than in the conductive sheet 6, for example, is set between 3 and 7 MPa in the rim strip rubber 11, and is set approximately between 2 and 6 MPa in the conductive sheet 6.

Since the rim strip rubber 11 is partitioned into the nonconductive rubber portion 11a and the conductive rubber portion 11b, a volume of the conductive rubber in the rim strip rubber 11 is reduced in comparison with a case that a whole of the rim strip rubber 11 is formed by the conductive rubber. In the present embodiment, since the nonconductive rubber portion 11a covers the conductive rubber portion 11b from the outer side in the tire width direction, and the conductive rubber portion 11b is formed in such a manner as to extend slender manner, it is possible to effectively reduce the volume of the conductive rubber in the rim strip rubber 11.

Further, the present embodiment is structured such that the conductive rubber portion 11b of the rim strip rubber 11 covers the terminal end portion (the lower end portion) of the conductive sheet 6 from the outer side in the tire width direction, and the conductive rubber portion 11b is accurately connected to the conductive sheet 6. From this point of view, it is preferable that a length L of a portion in which the conductive rubber portion 11b covers the conductive sheet 6 is equal to or more than 10 mm.

The conductive rubber points to a rubber in which a specific volume resistance is less than $10^8 \Omega \cdot cm$, and is produced, for example, by blending a carbon black serving as a reinforcing agent in a raw material rubber at a high ratio. The conductive rubber can be obtained by blending a predetermined amount of known conductivity applying material such as a carbon including a carbon fiber, a graphite and the like, or a metal including a metal powder, a metal oxide, a metal flake, a metal fiber and the like in addition to the carbon black. Further, the nonconductive rubber points to a rubber in which a specific volume resistance is equal to or more than $10^8$ $\Omega \cdot cm$, and is produced, for example, by blending a silica serving as the reinforcing agent in the raw material rubber at a high ratio.

As for the raw material rubber mentioned above, the following are exemplified; i.e., natural rubber, styrene-butadiene rubber (SBR), butadiene rubber (BR), isoprene rubber (IR), butyl rubber (IIR) and the like. These materials may be used alone or in combination. The above raw rubber is appropriately blended with a curing agent, a cure accelerator, a plasticizer, an antioxidant and the like.

Figure 2:
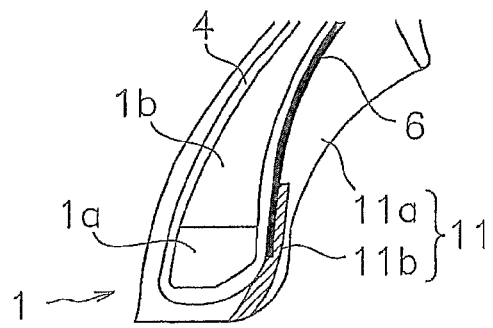
FIG. 2 is a cross sectional view showing a bead portion in accordance with the other embodiment of the present invention.

In the present embodiment, the terminal end portion (the lower end portion) of the conductive sheet 6 is arranged in a side of the bead filler 1b, however, may be arranged in a side of the bead core 1a as shown in FIG. 2. In this case, since the conductive rubber portion 11b can be made short, it is possible to effectively reduce the volume of the conductive rubber in the rim strip rubber 11, and it is beneficial for securing an effect of improving a rolling resistance.

Figure 3:
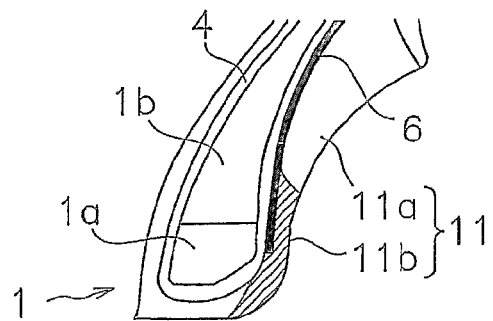
FIG. 3 is a cross sectional view showing a bead portion in accordance with the other embodiment of the present invention.

Further, as shown in FIG. 3, there can be thought that the rim strip rubber 11 is partitioned into inner and outer sides in the tire diametrical direction. In this case, since it is possible to comparatively easily form the rim strip rubber 11, an advantage in manufacturing can be obtained. However, since an interface of the rubber layer is formed in the outer surface of the bead portion 1, it is preferable to partition the rim strip rubber 11 into inner and outer sides in the tire width direction as shown in FIGS. 1 and 2, for suppressing a damage due to the rim friction.

In the tire T shown in FIG. 1, the upper end portion of the conductive sheet 6 is exposed to an outer end in the tire width direction of the tread rubber 13, and the conductive sheet 6 comes into contact with a road surface and a static electricity is discharged at a time of turning or in a case where an applied load to the tire is great. Accordingly, in the light of enhancing a discharge frequency of the static electricity so as to improve the electrical conduction performance, it is preferable that the tread rubber 13 is provided with a tread conductive portion which is formed by the conductive rubber and reaches the ground-contacting surface from the conductive sheet 6.

Figure 4:
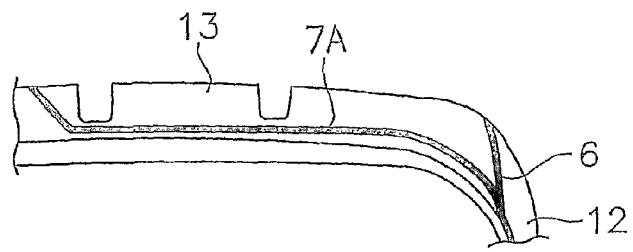
FIGS. 4(A) to 4(C) are cross sectional views schematically showing a tread rubber provided with a tread conductive portion.
Figure 4:
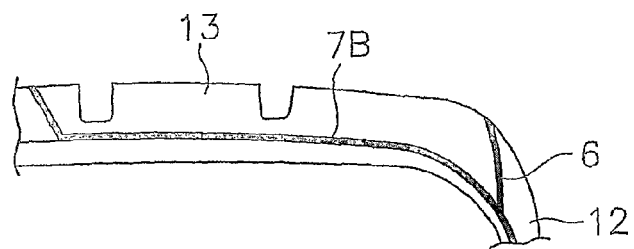
Figure 4:
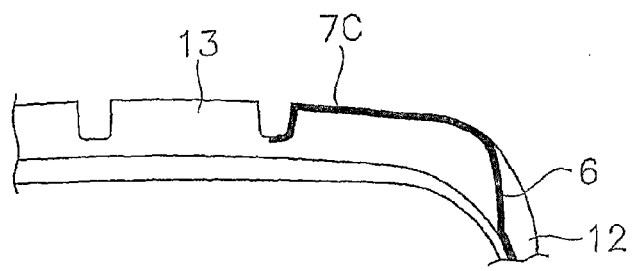

In FIG. 4, FIG. 4(A) is an example in which a tread conductive portion 7A reaches a side surface while crossing the tread rubber 13. FIG. 4(B) is an example in which a tread conductive portion 7B extends along a bottom surface of the tread rubber 13. FIG. 4(C) is an example in which a tread conductive portion 7C extends along a surface of the tread rubber 13. In each of the tread conductive portions, one end is exposed to the ground-contacting surface, and another end is connected to the conductive sheet 6. If the conductive sheet 6 is conductive with the ground-contacting surface at a time of being installed to the rim, by setting the tread conductive portions mentioned above, the upper end portion of the conductive sheet 6 may not be exposed to the outermost surface.

In the tire T in FIG. 1, there is employed a side-on tread structure in which an end portion of the side wall rubber 12 is mounted on an end portion of the tread rubber 13, however, the present invention is not limited to this structure, but it is possible to employ a tread-on side structure in which the end portion of the tread rubber 13 is mounted on the end portion of the side wall rubber 12. In this case, it is preferable that the tread conductive portion as mentioned above is provided in such a manner as to make the conductive sheet 6 be conductive with the road surface.

Figure 5:
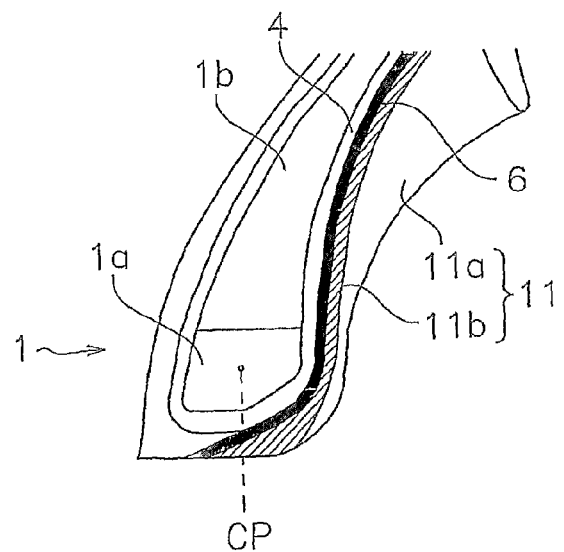
FIG. 5 is a cross sectional view showing a bead portion in accordance with the other embodiment of the present invention.

FIG. 5 is a cross sectional view showing a bead portion 1 in accordance with the other embodiment of the present invention. In this example, the conductive sheet 6 is extended to an inner side in the tire diametrical direction along the carcass 4, and is exposed in a bead toe side of the bead bottom surface, however, since the bead toe side of the bead bottom surface has a small risk of an attrition due to the rim friction, it is possible to prevent an adverse effect applied to the electrical conduction performance due to the rim friction. In addition, since the terminal end portion of the conductive sheet 6 is not arranged between the carcass 4 and the rim strip rubber 11, it is possible to suppress a generation of a step defect such as an air remaining or the like.

Further, in the rim strip rubber 11, the conductive rubber portion 11b is extended to the bead toe side along the conductive sheet 6, and is structured such that it can well secure the electrical conduction performance. The bead toe side indicates an inner side in the tire width direction based on a width center position CP of the bead core 1a, with regard to a peripheral position of the bead bottom surface. On the contrary, an outer side in the tire width direction than that of the center position CP of the bead core 1a comes to a bead heel side, and has a greater risk of attrition due to the rim friction in comparison with the bead toe side.

The pneumatic tire in accordance with the present invention can be structured in the same manner as the normal pneumatic tire except the matter that the rim strip rubber is structured by arranging the conductive sheet as mentioned above, and the material, the shape, the structure, the manufacturing method and the like which have been conventionally known can be all applied to the present invention. For example, in the embodiment mentioned above, the outer surface of the tire T is provided with the triangular rim protector which bulges along the rim flange, however, a tire shape which does not have the rim protector mentioned above may be employed.

What is claimed is:

1. A pneumatic tire comprising:
 a carcass which reaches a bead portion from a tread portion via a side wall portion;
 a tread rubber which is formed by a nonconductive rubber and constructs an outer surface of the tread portion in an outer side of the carcass;
 a side wall rubber which is formed by a nonconductive rubber and constructs an outer surface of the side wall portion in the outer side of the carcass; and
 a rim strip rubber which constructs an outer surface of the bead portion in the outer side of the carcass,
 wherein the pneumatic tire has a conductive sheet which is formed by a conductive rubber, reaches the rim strip rubber from the tread rubber while passing between the carcass and the side wall rubber, and terminates without being exposed to an outer surface of the bead portion,
 wherein the rim strip rubber is partitioned into a nonconductive rubber portion and a conductive rubber portion, and the conductive rubber portion is connected to the conductive sheet and is exposed to a bead bottom surface,
 wherein the nonconductive rubber portion of the rim strip rubber covers an entire outer side of the conductive rubber portion in a tire width direction such that the entire outer side of the conductive rubber portion in the tire width direction does not contact a rim, and
 wherein a radially inner end of the conductive rubber portion terminates on an outer side of the bead bottom surface in a tire width direction.

2. The pneumatic tire according to claim 1, wherein the conductive sheet is terminated between the carcass and the rim strip rubber, and the conductive rubber portion of the rim strip rubber covers a terminal end portion of the conductive sheet from an outer side in a tire width direction.

3. The pneumatic tire according to claim 1, wherein an end of the conductive sheet is arranged on a side of a bead core.

4. A pneumatic tire, comprising:
 a carcass which reaches a bead portion from a tread portion via a side wall portion;
 a tread rubber which is formed by a nonconductive rubber and constructs an outer surface of the tread portion in an outer side of the carcass;
 a side wall rubber which is formed by a nonconductive rubber and constructs an outer surface of the side wall portion in the outer side of the carcass; and
 a rim strip rubber which constructs an outer surface of the bead portion in the outer side of the carcass,
 wherein the pneumatic tire has a conductive sheet which is formed by a conductive rubber, reaches the rim strip rubber from the tread rubber while passing between the carcass and the side wall rubber, and terminates without being exposed to an outer surface of the bead portion,
 wherein the rim strip rubber is partitioned into a nonconductive rubber portion and a conductive rubber portion, and the conductive rubber portion is connected to the conductive sheet and is exposed to a bead bottom surface, and wherein the conductive sheet is extended to an inner side in a tire diametrical direction along the carcass, and is exposed in a bead toe side of the bead bottom surface.

5. The pneumatic tire according to claim 4, wherein the conductive rubber portion of the rim strip rubber is extended to the bead toe side along the conductive sheet.

\* \* \* \* \*